US009544656B1

(12) United States Patent
Nichols

(10) Patent No.: US 9,544,656 B1
(45) Date of Patent: Jan. 10, 2017

(54) SYSTEMS AND METHODS FOR RECOGNITION OF SIGN LANGUAGE FOR IMPROVED VIEWING EXPERIENCES

(71) Applicant: Rovi Guides, Inc., Santa Clara, CA (US)

(72) Inventor: Michael R. Nichols, La Canada Flintridge, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/927,923

(22) Filed: Oct. 30, 2015

(51) Int. Cl.
*H04N 21/485* (2011.01)
*H04N 21/488* (2011.01)
*H04N 21/435* (2011.01)
*H04N 21/45* (2011.01)
*H04N 21/4223* (2011.01)
*G06K 9/00* (2006.01)
*G10L 15/00* (2013.01)

(52) U.S. Cl.
CPC ...... *H04N 21/4856* (2013.01); *G06K 9/00355* (2013.01); *G10L 15/005* (2013.01); *H04N 21/4223* (2013.01); *H04N 21/435* (2013.01); *H04N 21/4532* (2013.01); *H04N 21/4884* (2013.01)

(58) Field of Classification Search
CPC combination set(s) only.
See application file for complete search history.

(56) References Cited

U.S. PATENT DOCUMENTS

| 8,566,075 | B1* | 10/2013 | Bruner | H04N 21/234336 704/2 |
| 8,819,812 | B1* | 8/2014 | Weber | G06F 3/017 726/18 |
| 2015/0304727 | A1* | 10/2015 | Vandichalrajan | H04N 21/2343 725/40 |

* cited by examiner

*Primary Examiner* — Mulugeta Mengesha
(74) *Attorney, Agent, or Firm* — Ropes & Gray LLP

(57) ABSTRACT

Systems and methods are described herein for selecting a closed captioning language track. Control circuitry may capture an image or video of a user while the user is performing a gesture of a sign language. The control circuitry may access a database comprising a plurality of entries corresponding to a plurality of gestures in respective sign languages. The control circuitry may compare a first pixel map corresponding to the image or video of the user with pixel maps corresponding to each of the plurality of entries in order to identify a preferred sign language. The control circuitry may receive metadata associated with a media asset comprising a plurality of closed captioning language tracks, each closed captioning language track comprising closed captioning for the media asset in a different language and select one of the closed captioning language tracks that corresponds to the preferred sign language.

20 Claims, 6 Drawing Sheets

700

```
700 ...
701 Initialization Subroutine
702 ...
703 //Routine to compare a first pixel map and a second pixel map:
704 Receive (array) pixelmap_gesture_1
705
706 num_matching_pixels = 0;
707 Access database of sign language entries
708 For each database entry (i = 1 to [end])
709   Receive (array) pixelmap_gesture_2
710   A = avg(pixelmap_gesture_2)
711   norm_pixelmap_gesture_1 = pixelmap_gesture_1 / A
712   For each pixel in norm_pixelmap_gesture_1 (j = 1 to [end])
713     If (norm_pixelmap_gesture_1(j) – pixelmap_gesture_2(j) <= threshold_1)
714         num_matching_pixels++;
715   End For
716   If num_matching_pixels > threshold_2
717     store indication of sign language associated with pixelmap_gesture_2
718 End For
719 ...
720 Termination Subroutine
721 ...
```

FIG. 7

SYSTEMS AND METHODS FOR RECOGNITION OF SIGN LANGUAGE FOR IMPROVED VIEWING EXPERIENCES

BACKGROUND

Media assets are often distributed with closed captioning language tracks which include text that follows the spoken dialogue in the media asset in order to aid users who are deaf or hard of hearing. Multiple closed captioning language tracks may also be distributed, with each closed captioning language track including text in a different language or a different version of the text in the same language. Typically, a user selects a preferred closed captioning language track that matches the user's language preferences or sets an option to indicate a preferred language track so that the system may automatically select an appropriate closed captioning language track. In both cases, the user must specifically indicate their preferred language in order for the system to display the appropriate closed captioning language track with the media asset. Users of closed captioning language tracks, who are often deaf, hard of hearing, and/or mute, often utilize sign language to communicate with others. Traditional systems do not however have a way to tie the use of sign language to media consumption language preferences.

SUMMARY

Accordingly, systems and methods are described herein for automatically selecting a closed captioning language track based on sign language used by a user. According to one aspect, control circuitry may capture an image or video of a user while the user is performing or communicating using a gesture of a sign language. For example, control circuitry may use imaging hardware, such as a camera, to record the user while the user is watching a media asset. The control circuitry may identify the gesture in the image or video of the user using image recognition software. The control circuitry may next access a database including a plurality of different sign language libraries, with each sign language library including a plurality of samples gestures in a particular sign language. The control circuitry may attempt to match the user's gesture to one or more of the gestures in the sign language libraries in order to determine which sign language(s) the user's gesture belongs to. Based on the comparison, the control circuitry may determine that the identified gesture belongs to one or more of the plurality of different sign language libraries. The control circuitry may also receive metadata associated with a media asset including a plurality of closed captioning language tracks, with each closed captioning language track may include closed captioning for the media asset in a different language. Finally, the control circuitry may select one of the closed captioning language tracks that corresponds to the determined one or more of the plurality of different sign language libraries.

According to another aspect, control circuitry may perform a method for selecting a closed captioning language track. The control circuitry may capture an image or video of a user while the user is performing or communicating using a first gesture of a sign language. The control circuitry may either directly capture the image or video of the user using, for example, imaging circuitry such as a camera, or receive the image or video from a remote storage location. The image or video of the user may have been taken at any suitable time, including while a media asset is being displayed to the user. The image or video of the user may include at least a first pixel map including a plurality of pixels.

The control circuitry may access a database of sign language gestures including a plurality of entries. Each database entry may include a pixel map, for instance from a sample image or video, that corresponds to a gesture in a respective sign language. The database entry may also include an indication of the respective sign language. For example, the control circuitry may have access to one or more sign language database that maintain entries on gestures in a variety of sign languages, including, but not limited to, American sign language, Pidgin Signed English, Signing Exact English, Spanish sign language, Catalan sign language, French sign language, German sign language, British sign language, Chinese sign language, Japanese sign language, Irish sign language, Auslan, Swedish sign language, and finger spelling. As used herein, the term "gesture" shall mean any movement or orientation of any part of the body used to express an idea or meaning, including, but not limited to, a hand shape, a hand orientation, a movement of the hand, arm, or body, a lip movement, body language, or a facial expression.

The control circuitry may compare the first pixel map from the image or video of the user against a plurality of pixel maps from the database entries in order to identify a matching database entry and, ultimately, a sign language that the gesture belongs to. For each respective database entry, the control circuitry may extract a second pixel map from the respective entry. For example, the control circuitry may access local or remote storage that stores the respective entry and retrieve from the storage the second pixel map. The control circuitry may optionally normalize the first pixel map to the average pixel value of the second pixel map. Normalizing the first pixel map may be useful for accounting for differences in lighting or brightness levels. For instance, the control circuitry may calculate an average pixel value for the first pixel map and the second pixel map and multiply each pixel in the first pixel map by a multiplier equal to the ratio of the average value of the second pixel map to the average value of the first pixel map. In this manner, the average value of the first pixel map will be the same as the second pixel map, allowing the two pixel maps to be compared on a relative level. In some embodiments, resizing, scaling, or cropping may also be required in order to properly compare the pixel maps.

Using the normalized first pixel map and the second pixel map, the control circuitry may compare pixels of the first pixel map to pixels of the second pixel map in order to identify patterns of pixels that match in the two pixel maps. For example, the control circuitry may compare, pixel by pixel, a first pixel from the first pixel map with a corresponding pixel from the second pixel map. If the value of the two pixels (for instance, a color/hue/brightness value) are within a specified threshold, then the two pixels may be identified as "matching." The control circuitry may keep track of the number of matching pixels, and if, at the end of the comparison, the number of matching pixels exceeds a certain value or percentage, then the two pixel maps may be identified as "matching" or "similar." It will be understood that the control circuitry may use more sophisticated methods of comparing the first and second pixel maps, as will be understood by those skilled in the art. For example, the control circuitry may compare groups/matrices of pixels from the two pixel maps in order to identify patterns.

If the two pixel maps are deemed to match, then the control circuitry may save an indication of the matching entry to storage. Once the first pixel map from the image or video of the user has been compared to each of the database entries, the control circuitry may retrieve the indications of matching entries from storage. If there is only one entry, then the control circuitry may continue to identify a corresponding closed captioning language track. If there are multiple entries, then the control circuitry may employ a variety of methods in order to select one of the entries as corresponding to a preferred sign language. In some embodiments, the control circuitry generates for display an alert to the user, the alert including user-selectable options that identify sign languages associated with each of the matching database entries. In this manner, the system automatically detects one of many sign languages that the user may be using and allows the user to indicate which language from a limited number of options he or she is using. For example, a particular gesture may be common to more than one sign language, so analyzing a single gesture may not be determinative in identifying a single preferred sign language.

In some embodiments, the control circuitry captures or receives a second image or video of the user performing or communicating using a different gesture in the sign language. Using the methods described throughout, the control circuitry may identify one or more sign languages that the second gesture may correspond to. In this manner, the control circuitry may continue to iterate through one or more additional gestures until only one sign language is identified as including all of the analyzed gestures.

In some embodiments, the control circuitry may also analyze other aspects of the sign language, such as the cadence and/or grammar of the user's gestures. These embodiments may require the control circuitry to capture additional images or videos of the user performing or communicating using additional gestures in the sign language. For instance, some sign languages may have characteristic cadences (such as timing or emphasis between two or more gestures) or grammar (such as a specific combination of a few words or sentence composition) that serve as further identifying features. In such embodiments, each of the database entries may have information on the specific cadence or grammar for the gesture in the associated sign language. In addition to comparing pixel maps, the control circuitry may also compare the cadence and/or grammar information between the captured images or videos of the user and the database entries.

The control circuitry may receive metadata associated with a media asset that includes one or more closed captioning language tracks. Each closed captioning language track may include text for the media asset in a different language. The control circuitry may select one of the closed captioning language tracks that corresponds to the preferred sign language. For instance, each database entry, in addition to indicating the associated sign language, may also indicate one or more associated spoken and/or written languages. As an illustrative example, a database entry for a gesture in American Sign Language may indicate that spoken and written English are associated languages. The control circuitry may retrieve the associated spoken/written languages and select the closed captioning language track that matches this spoken/written language. In some embodiments, the closed caption language tracks may include indicators that identify associated sign languages. In such embodiments, the control circuitry may select the closed caption language track that matches the preferred sign language.

In some embodiments, the control circuitry may also generate for display the media asset with the closed captioning language track. For example, the control circuitry may overlay the text from the control circuitry at the appropriate time while the media asset is playing. In some embodiments, the control circuitry may also display an alert to the user that indicates the selected closed captioning language track. For example, the control circuitry may briefly pop up a window that indicates that the "English" closed captioning track is being displayed. The pop-up may disappear after a predetermined amount of time.

In some embodiments, where two or more closed caption language tracks match the preferred sign language, or when a single preferred sign language cannot be determined, then the control circuitry may generate for display an alert that includes user-selectable options indicating two or more of the closed captioning language tracks. In this manner, the user may select the desired closed captioning language track that appears to match their sign language usage. In some embodiments, the preferred sign language and/or the selected closed captioning language track may be saved to a user profile and retrieved later for future use.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 shows illustrative pseudocode for a process for control circuitry to compare a first pixel map with a second pixel map in accordance with some embodiments of the disclosure.

DESCRIPTION

Figure 1:
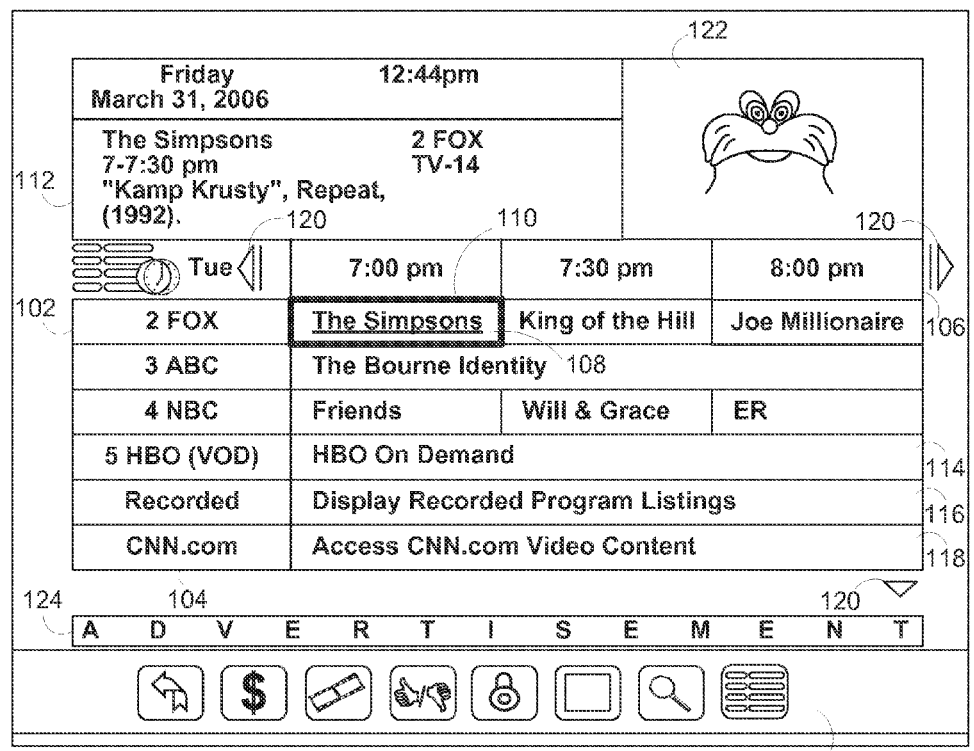
FIG. 1 shows an illustrative example of a display screen for use in accessing media content in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. The media guidance data may also include database entries corresponding to sign language gestures, pixel maps corresponding to gestures in a sign language, and/or closed captioning language tracks which contain text associated with a media asset.

Figure 2:
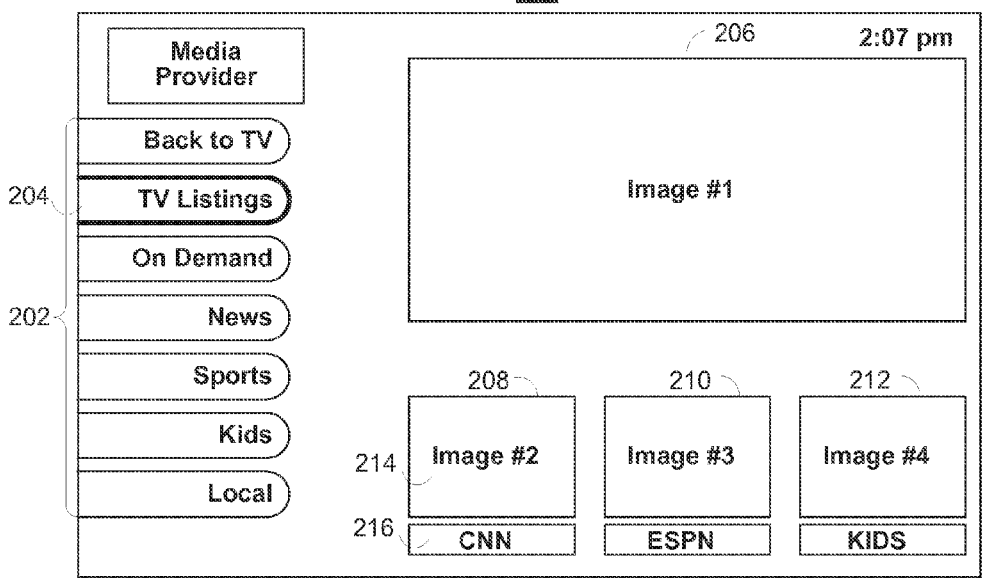
FIG. 2 shows another illustrative example of a display screen used to access media content in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options. The options may also include the ability to select between one of several closed captioning options or to indicate a preferred sign language from a plurality of options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. The media guidance application may also store the user's language preferences in the user's profile, such as the user's preferred sign language, other sign languages that the user uses, and the user's preferred closed captioning language or languages. Additionally, the media guidance application may obtain all or part of other user profiles that are related to a particular user (e.g., from other web sites on the Internet the user accesses, such as www.all-rovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
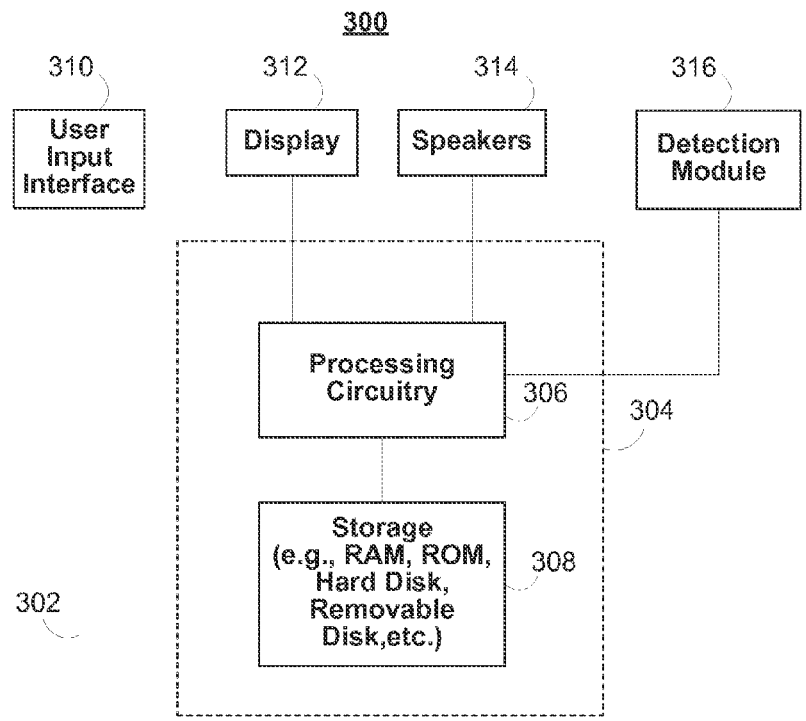
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN)

modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be configured to store identifications of user-defined portions of media assets (for example, start and end times of portions of media assets), identifications of portions of media assets provided by a content provider, and user ratings for portions of media assets. Storage 308 may also store identifications of media assets that have been identified based on the stored user ratings. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

The control circuitry 304 may also include image/video comparison circuitry suitable for comparing pixel maps between two or more images or video. For example, the control circuitry 304 may include dedicated graphics hardware configured to perform image processing algorithms for comparing the images or video. In some embodiments, the control circuitry 304 may access and run image recognition software stored on storage, such as storage 308. Pattern and image recognition techniques are described in greater detail in U.S. Pat. No. 5,065,440, U.S. Pat. No. 4,658,428, and U.S. Pat. No. 5,133,022, which are hereby incorporated by reference herein in their entireties.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

Detection module 316, or the detection module circuitry, may be incorporated into, coupled to, or accessible by the media guidance application (e.g., via control circuitry 304). Detection module 316 may be used to measure, monitor, capture, identify, and determine gestures of a user while the user is performing or communicating using sign language. For example, the detection module 316 may track the orientation and movements of the user's body, hand, fingers, and/or monitor a user's facial expressions.

Detection module 316 may use any suitable sensor to detect movement, including, but not limited to, an optical sensor or an infrared sensor. The movement sensor may detect movement as separate images at a specific frequency or framerate, and the frequency or framerate may be either fixed or variable. For example, the movement sensor may detect movement at a first framerate, and in response to detecting movement of a user such as a sign language gesture, the movement sensor may increase the framerate to a second framerate that is higher than the first framerate. The movement sensor may continue to detect movement at the second, increased framerate for a set period of time before reverting to the first framerate. The movement sensor may revert back to the first framerate after a period of time of detecting no movement. In some embodiments, an audio sensor may be used to detect sound from the user or the user's environment. The audio sensor may detect volume, frequency, pitch, tone, or any other audio characteristics.

Detection module 316 may further include various components (e.g., a video detection component, an audio detection component, etc.) for determining and/or detecting other types of information. In some embodiments, detection module 316 may include an audio/video detection component, which determines or receives information describing objects in images and/or noise emanating from a user or media asset.

For example, detection module 316 may include one or more content-recognition modules, which may be used by the media guidance application to analyze information received from a content capture device (e.g., video and/or audio recorder). For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video and audio recordings. For example, the media guidance application may receive a media asset in the form of a video (e.g., the media asset and/or video of a user viewing the media asset). The video may include a series of frames. For each frame of the video, the media guidance application may use an object recognition module or image recognition software to determine the characteristics associated with each frame (or the media assets as a whole) of the video to determine if any sign language gestures are contained in the frames.

In some embodiments, detection module 316 may include a Global Positioning System ("GPS") detection component, which determines or receives information describing the geographic position of a user. Control circuitry 304 may use the position of the user to determine a preferred sign, spoken, or written language in the user's area. For example, if the user's location is the United States, then the control circuitry 304, in its analysis to identify a preferred sign language, may apply a weighting factor to American Sign Language as a sign language and English as a spoken/written language.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
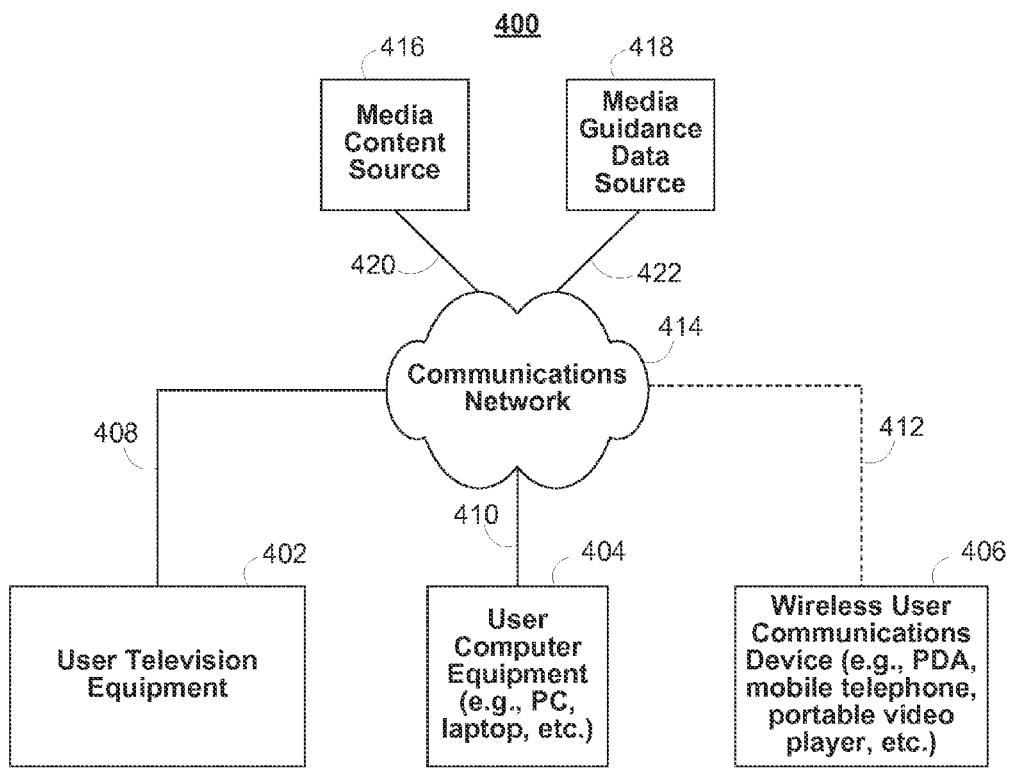
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. For example, media guidance data source 418 may store a database including a plurality of media assets, each media asset associated with one or more properties. Upon request, media guidance data source 418 may access the database and transmit a list of the plurality of media assets or a subset of media assets. Media guidance data source 418 may also search the database for one or more media assets that are associated with a particular property.

Media guidance data source 418 may also include one or more databases including a plurality of sign language gesture entries. Each database entry may include a plurality of fields including at least a pixel map field corresponding to an image or video of a gesture in a particular sign language as well as a field indicating an identifier of the particular sign language. The database entry may also include fields containing any other related information, including a cadence field and/or grammar usage field of the sign language gesture. The media guidance data source 418 may be queried or searched, for example by control circuitry 304, and the query or search may access and/or compare one or more of the fields in each database entry.

One of the media content source 416 or the media guidance data source 418 may also provide closed captioning language tracks associated with media assets. The closed captioning language track may include text in a particular language that corresponds to the media assets. For example, closed captioning tracks typically include text displayed at particular times during playback of the media asset that matches the spoken dialogue in the media asset. In this manner, users who are deaf or hard of hearing may follow along with the spoken dialog of the media asset even though they are unable to hear the spoken dialog. The closed captioning language tracks may also include an indication of the particular written language of the text as well as an indication of any related sign languages. For example, the closed captioning language track for English text may include an indication that American Sign Language is an associated sign language, so that the English closed captioning language track should be selected for users of American Sign Language.

Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
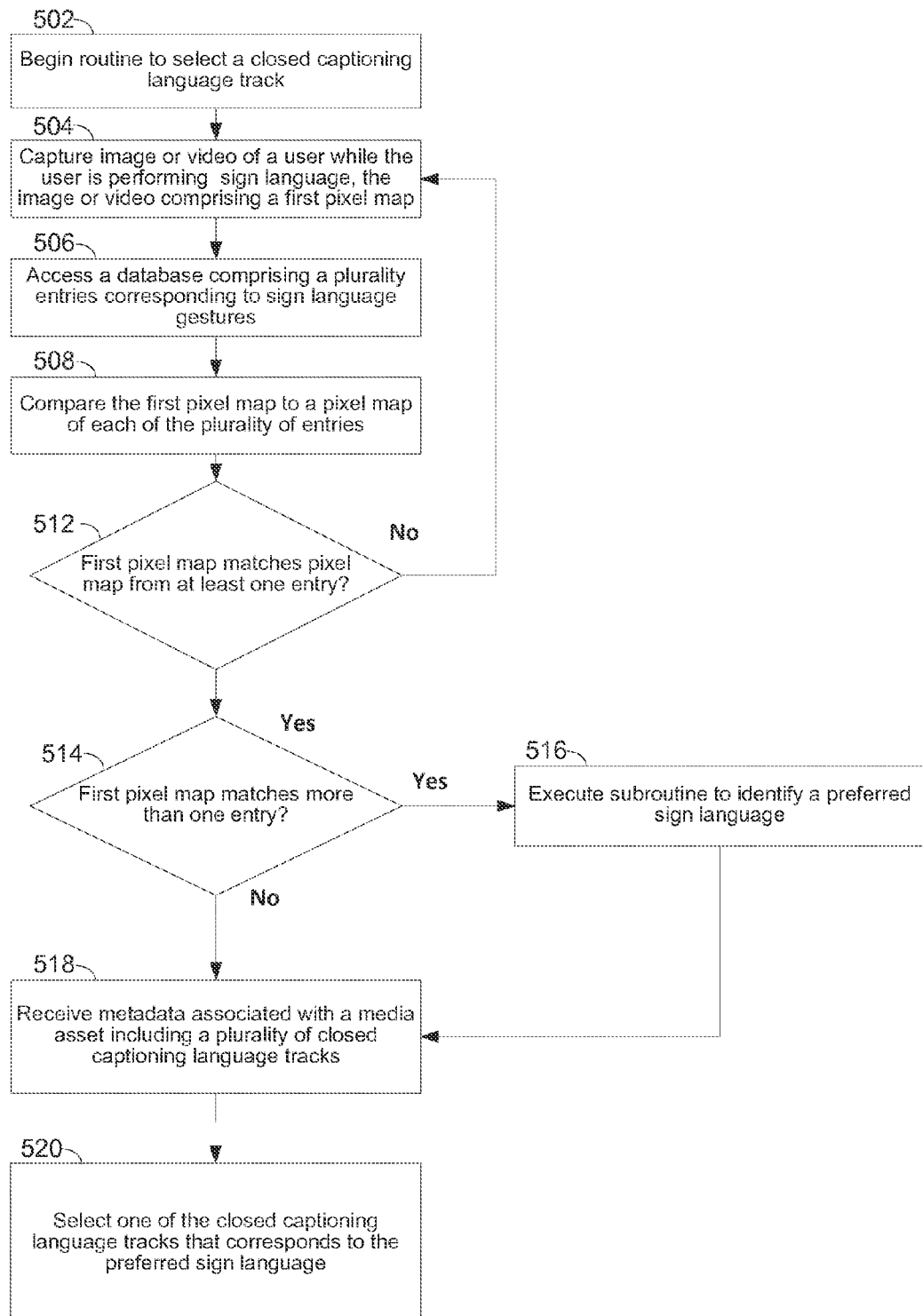
FIG. 5 is a flowchart that describes a process for control circuitry to select a closed captioning language track in accordance with some embodiments of the disclosure.

FIG. 5 is a flowchart 500 that describes a process for control circuitry (such as control circuitry 304) to select a closed captioning language track in accordance with some embodiments of the disclosure. In some embodiments, this process may be encoded on to non-transitory storage medium (such as storage device 308) as a set of instructions to be decoded and executed by processing circuitry (such as processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, image recognition and analysis circuitry, and the like.

At 502, the process to select a closed captioning language track may begin. In some embodiments, the process may begin either directly or indirectly in response to a request from the user or a user action, such as an input into user input interface 310. For example, the process may begin directly in response to control circuitry 304 receiving signals from user input interface 310 or control circuitry 304 may prompt the user to confirm their input using a display (such as display 312) prior to running the process.

At 504, the control circuitry 304 proceeds to capture an image or video of a user while the user is performing or communicating using sign language, the image or video includes a first pixel map. In some embodiments, the control circuitry captures the image or video using imaging hardware, such as detection module 316. In some embodiments, the control circuitry may simply receive the image or video of the user from storage, such as storage 308.

At 506, the control circuitry 304 accesses a database including a plurality of entries corresponding to sign language gestures. The database may be stored on local storage, such as storage 308, or remote storage, such as media guidance data source 418. The control circuitry 304 may communicate with the database using any suitable means, including combinations of local data connections and network connections such as the Internet. The control circuitry 304 may generate a query or search request and communicate the query or search request to the database. In some embodiments, the query or search request includes the first pixel map and a request to compare the first pixel map to a plurality of pixel maps from a plurality of entries in the database. In such embodiments, the database may perform the comparison and return a message with indications of any matching database entries. In some embodiments, the query or search request sent to the database includes a request to transmit database entries to the control circuitry 304. In such embodiments, the control circuitry 304 may perform the comparison steps, as described below.

At 508, the control circuitry 304 compares the first pixel map to a pixel map of each of the plurality of entries in the database. In some embodiments, the control circuitry 304 may utilize image recognition software to recognize a first gesture in the first pixel map, a second gesture in the pixel map of a database entry, and to determine whether the first gesture matches the second gesture. The comparison step is described in further detail below in relation to FIGS. 6 and 7. At 512, the control circuitry 304 may determine whether the first pixel map matches the pixel map from at least one entry. If the first pixel map does not match any database entry, indicating that the gesture is unrecognizable as a sign language gesture, the control circuitry may return to 504 and capture another image or video of the user while the user is performing or communicating using sign language.

If the first pixel map matches at least one database entry, then the control circuitry 304 may store a pointer or indicator to the matching database entry and determine, at 514, whether the first pixel map matches more than one database entry. If the first pixel map matches more than one entry, then the control circuitry 304 may execute a subroutine at 516 to identify one of the sign languages associated with the matching entries as a preferred sign language. For example, in some embodiments, the control circuitry 304 may access the pointers or indicators stored for the matching database entry and generate for display an alert to the user, the alert including user-selectable options that identify sign languages associated with each of the matching database entries. In this manner, the system automatically detects one of many sign languages that the user may be using and allows the user to indicate which language from a limited number of options he or she is using. For example, a particular gesture may be common to more than one sign language, so analyzing a single gesture may not be determinative in identifying a single preferred sign language.

In some embodiments, the control circuitry 304 captures or receives a second image or video of the user performing or communicating using a different gesture in the sign language in order to determine a preferred sign language. The additional gesture may provide additional information that allows the control circuitry 304 to determine a single preferred sign language. The control circuitry may identify one or more sign languages that the second gesture may correspond to. In this manner, the control circuitry may continue to iterate through one or more additional gestures until only one sign language is identified as including all of the analyzed gestures.

In some embodiments, the control circuitry may also analyze other aspects of the sign language, such as the cadence and/or grammar of the user's gestures in order to identify a preferred sign language. These embodiments may require the control circuitry to capture additional images or videos of the user performing or communicating using additional gestures in the sign language. For instance, some sign languages may have characteristic cadences (such as timing or emphasis between two or more gestures) or grammar (such as a specific combination of a few words or sentence composition) that serve as further identifying features. In such embodiments, each of the database entries may have information on the specific cadence or grammar for the gesture in the associated sign language. In addition to comparing pixel maps, the control circuitry may also compare the cadence and/or grammar information between the captured images or videos of the user and the database entries.

Once the control circuitry 304 identifies a preferred sign language, either because the first pixel map matched only one database entry at 514 or because it executed the subroutine at 516 to identify a single preferred sign language, the control circuitry 304 may continue to 518. At 518, the control circuitry 304 may receive metadata associated with a media asset including a plurality of closed captioning language tracks. The metadata may have been transmitted together with or separately from the media asset, for example from media content source 416 or media guidance data source 418. In some embodiments, the metadata is automatically transmitted to the user equipment 402, 404, or 406 in response to transmitting the media asset. In some embodiments, the control circuitry 304 may send a query to one of media content source 416 or media guidance data source 418 to provide one or more closed captioning language tracks to the user equipment 402, 404, or 406. The query may include an indication of the media asset desired as well as the request for the closed captioning tracks. In some embodiments, the query may also include an indication of a preferred sign language or a preferred spoken/written language. In response, the media content source 416 or media guidance data source 418 may transmit a closed captioning language track for the preferred sign language or preferred spoken/written language.

The control circuitry 304 may select, at 520, one of the closed captioning language tracks that corresponds to the preferred sign language. In some embodiments, each sign language database entry, in addition to indicating the associated sign language, may also indicate one or more associated spoken and/or written languages. As an illustrative example, a database entry for a gesture in American Sign Language may contain a field or fields that indicate that spoken and written English are associated languages. The control circuitry 304 may retrieve the associated spoken/written languages and select the closed captioning language track that matches this spoken/written language. In some embodiments, the closed caption language tracks may include fields that identify associated sign languages. In such embodiments, the control circuitry 304 may select the closed caption language track that matches the preferred sign language.

Figure 6:
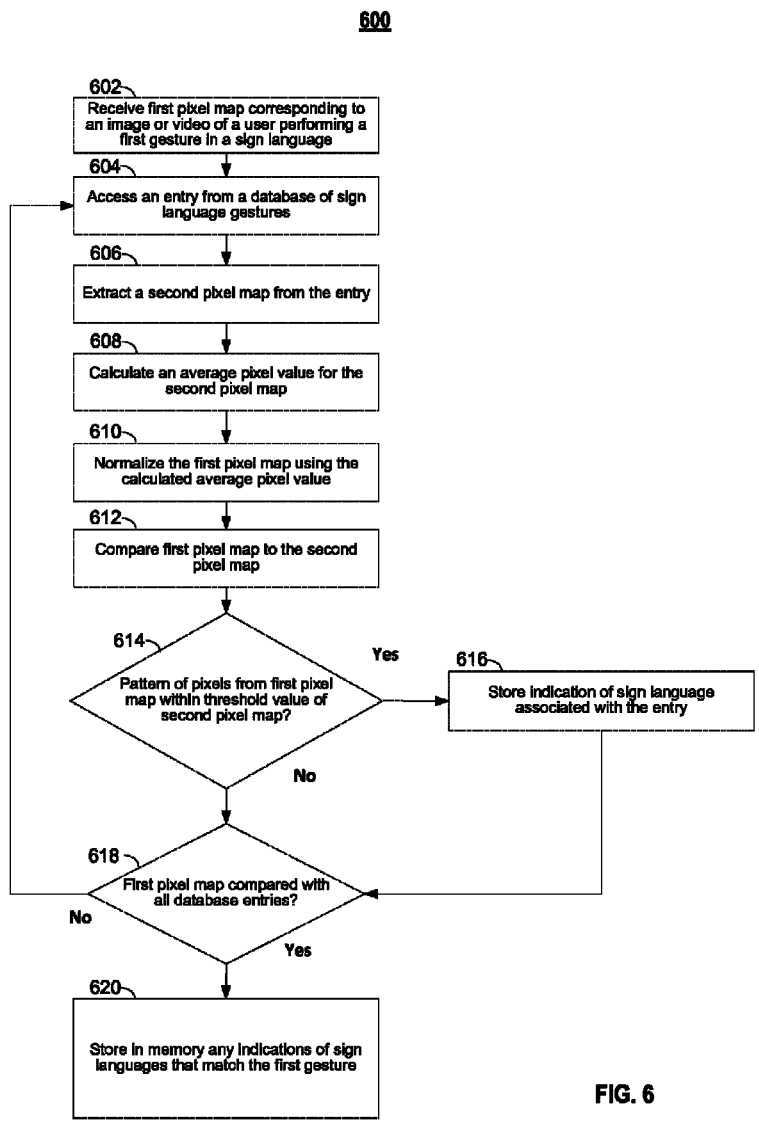
FIG. 6 is a flowchart that describes a process for control circuitry to compare a first pixel map with a second pixel map in accordance with some embodiments of the disclosure.

FIG. 6 is a flowchart 600 that describes a process for control circuitry to compare a first pixel map with a second pixel map in accordance with some embodiments of the disclosure. At 602, control circuitry 304 may receive a first pixel map corresponding to an image or video of a user performing or communicating using a first gesture in a sign language. In some embodiments, 602 may be substantially similar to 504 depicted in FIG. 5. In some embodiments, the control circuitry 304 may resize, scale, and/or crop the first pixel map to select a portion of the image or video that includes the sign language gesture made by the user. At 604, the control circuitry 304 may access an entry from a database of sign language gestures. In some embodiments, 604 may be substantially similar to 506 depicted in FIG. 5. At 606, the control circuitry 606 may extract a second pixel map from the database entry. For example, the database entry may be stored either in local storage (such as storage 308) or in remote storage (such as in media guidance data source 418). The control circuitry 304 may access the database entry at one of these storage locations and retrieve the pixel map from the appropriate memory. The pixel map from the database entry may correspond to an image or video of a sample gesture in a particular sign language. In 608 and 610, the control circuitry 304 may optionally normalize the first pixel map to the average value of the second pixel map in order to compare the two pixel maps. In some embodiments, 608 and 610 may not be necessary or may be skipped. At 608, the average pixel value of the second pixel map is calculated. For example, the pixel value of each pixel in the second pixel map may be summed and the result divided by the number of pixels in the second pixel map. In some embodiments, the average pixel value of the first pixel map is also calculated. For example, the pixel value of each pixel in the first pixel map may be summed and the result divided by the number of pixels in the first pixel map. At 610, the first pixel map may be normalized using the average pixel value of the second pixel map. Normalization can occur using any suitable process, and may include making the average pixel value of both pixel maps the same. For instance, as an illustrative example, each pixel in the first pixel map may be multiplied by the ratio of the average pixel value of the second pixel map to the average pixel value of the first pixel map. In this manner, the first pixel map is adjusted so that the pixels have the same average value as the second pixel map.

At 614, the control circuitry 304 may determine whether a pattern of pixels from the first pixel map is within a threshold value of a corresponding pattern in the second pixel map. In some embodiments, the control circuitry 304 may compare, pixel by pixel, each pixel in the first pixel map with a corresponding pixel in the second pixel map. In some embodiments, the comparison may include resizing, scaling, and/or cropping one or both of the first pixel map and/or the second pixel map. If the value of a pixel from the first pixel map (for instance, a color/hue/brightness value) is within a specified threshold of a corresponding pixel from the second pixel map, then the two pixels may be identified as "matching." The control circuitry 304 may keep track of the number of matching pixels, and if, at the end of the comparison, the number of matching pixels exceeds a certain value or percentage, then the two pixel maps may be identified as "matching" or "similar." It will be understood that the control circuitry 304 may use more sophisticated methods of comparing the first and second pixel maps, as will be understood by those skilled in the art. For example, the control circuitry 304 may compare groups/matrices of pixels from the two pixel maps in order to identify patterns. In such embodiments, the control circuitry 304 may use edge detection, pattern detection, or other techniques to determine whether a similar pattern exists in a group of pixels from the first pixel map and a group of pixels from the second pixel map.

At 616, if the control circuitry 304 determines that a pattern of pixels from the first pixel map is within a threshold value of a pattern of pixels from the second pixel map, then the control circuitry 304 may store an indication of the sign language associated with the entity and continue to 618. Alternatively, if the pattern of pixels from the first pixel map is not within a threshold value of a pattern of pixels from the second pixel map, then the control circuitry 304 may continue to 618. At 618, the control circuitry 304 may determine whether the first pixel map has been compared to all database entries. If there are database entries remaining that need to be compared to the first pixel map, then the control circuitry 304 may return to 604 and access a different database entry. If there are no further database entries to be compared to the first pixel map, then the control circuitry 304 may continue to 620 and store in memory, such as storage 308, any indications of sign languages that match the first gesture. For example, control circuitry 304 may store each of the indications identified and stored at 616.

FIG. 7 shows illustrative pseudocode 700 for a process for control circuitry to compare a first pixel map with a second pixel map in accordance with some embodiments of the disclosure. It will be evident to one skilled in the art that the process described by the pseudocode in FIG. 7 may be implemented in any number of programming languages and a variety of different hardware, and that the style and format should not be construed as limiting, but rather a general template of the steps and procedures that would be consistent with code used to implement some embodiments of this disclosure.

At line 701, the process may run a subroutine to initialize variables and prepare to compare a first pixel map and a second pixel map, which begins on line 703. For example, in some embodiments control circuitry 304 may copy instructions from non-transitory storage medium (e.g., storage device 308) into RAM or into the cache for processing circuitry 306 during the initialization stage. Additionally, in some embodiments the value of various thresholds being used for comparison, or a tolerance level for determining if two values are essentially equivalent, may be retrieved, set, and stored at 701.

At line 604, control circuitry 304 may receive a first pixel map named pixelmap_gesture_1. The first pixel map may be an array of values which represents pixel values (such as color, hue, brightness, etc.) for each pixel in the first pixel map. In some embodiments, the first pixel map may be a three-dimensional array that represents a video of a user performing or communicating using a gesture in sign language. In such embodiments, the first pixel map may include a plurality of two-dimensional arrays of pixels, each two-dimensional array of pixels representing one frame of the video. In some embodiments the first pixel map may be retrieved from storage, such as local storage 308 or media guidance data source 418. For example, control circuitry 304 may receive the first pixel map by receiving, for example, a pointer to an array of values from storage 308 or media guidance data source 418. In another example, control circuitry 304 may receive an object of a class, such as an iterator object containing elements of the first pixel map.

At line 706, control circuitry 304 may initialize the counter num_matching_pixels to zero. At 707, the control circuitry 304 may access a database of sign language entries, each entry including at least a pixel map of a gesture performed in a particular sign language and an indication of the particular sign language. As discussed above, the database may be stored at any suitable location, including local storage 308 and remote storage such as media guidance data source 418. At 708, the control circuitry 304 may iterate through the various database entries. This loop may be implemented in multiple fashions depending on the choice of hardware and software language used to implement the process of FIG. 7; for example, this may be implemented as part of a "for" or "while" loop.

At line 709, control circuitry 304 will receive a second pixel map called pixelmap_gesture_2. As with the first pixel map, the second pixel map may be a multi-dimensional array of pixel values and may represent an image or video of a gesture being performed or communicated using a particular sign language. In some embodiments the second pixel map will be stored as part of a larger data structure or class, and the value of each pixel may be obtained through appropriate accessor methods. In some embodiments the second pixel map may be converted from numeric data into a string or other non-numeric data type by means of an appropriate hashing algorithm.

At line 710, the control circuitry 304 may calculate the average pixel value of the second pixel map and store it in a temporary variable "A." At 711, the control circuitry 304 uses this temporary variable A to normalize the first pixel map and store the result in a new variable called norm_pixelmap_gesture_1. In the illustrative example depicted in FIG. 7, this normalization calculation is depicted as the values of the first pixel map being divided by the average pixel value of the second pixel map. It will be understood that this calculation is provided for illustrative purposes only, and that other methods of normalization are contemplated.

At lines 712 to 715, the control circuitry 304 may iterate over each pixel in the normalized first pixel map. In some embodiments, control circuitry 304 may call a function to perform a comparison of the pixels of the first pixel map to corresponding pixels in the second pixel map. For example, at line 713, the control circuitry may determine whether a pixel in the first pixel map is within a threshold value, named threshold_1, of a corresponding pixel in the second pixel map. Although a pixel-to-pixel comparison is depicted in FIG. 7, it will be understood that this comparison step is provided for illustrative purposes only, and that other methods of comparing the first pixel map and the second pixel map are contemplated. For example, as discussed above, the control circuitry 304 may compare groups/matrices of pixels from the first pixel map with groups/matrices of pixels from the second pixel map. The control circuitry 304 may also employ other image recognition techniques, including edge detection and pattern detection algorithms, to aid in the comparison. At 714, the number of matching pixels is stored in a variable called num_matching_pixels.

At 716, if the number of matching pixels between the first pixel map and the second pixel map exceeds a second threshold, named threshold_2, then the control circuitry 304 will store an indication of the sign language associated with the second pixel map gesture. At 718, the control circuitry 304 will iterate to the next database entry until all database entries have been compared against the first pixel map.

At line 720, control circuitry 304 may run a termination subroutine after the process has performed its function. For example, in some embodiments control circuitry 304 may destruct variables, perform garbage collection, free memory or clear the cache of processing circuitry 306.

It will be evident to one skilled in the art that the process described by the pseudocode in FIG. 7 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed to speed operation, or the conditional statements may be replaced with a case-switch. In some embodiments, rather than iterating over all database entries, in some embodiments the code may be rewritten so control circuitry 304 is instructed to evaluate multiple database entries simultaneously on a plurality of processors or processor threads, lowering the number of iterations needed and potentially speeding up computation time.

Figure 8:
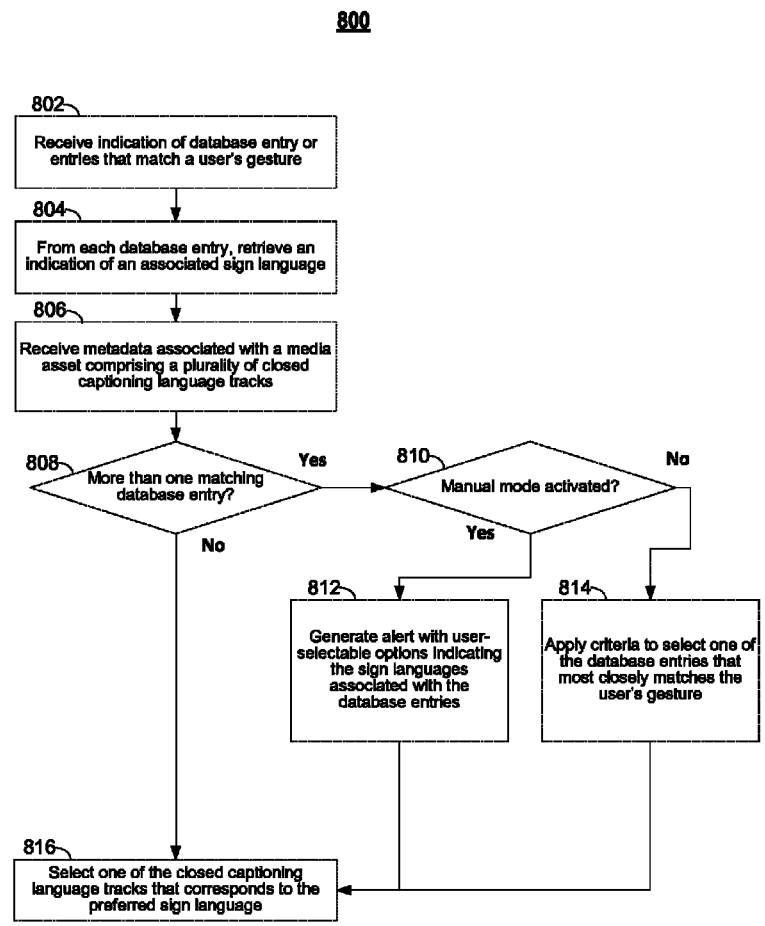
FIG. 8 is a flowchart that describes a process for control circuitry to select a closed captioning language track in accordance with some embodiments of the disclosure.

FIG. 8 is a flowchart 800 that describes a process for control circuitry 304 to select a closed captioning language track in accordance with some embodiments of the disclosure. At 802, control circuitry 304 may receive an indication of a database entry or entries that match a user's gesture. For example, control circuitry 304 may retrieve from storage (such as local storage 308 or media guidance data source 418) the indications of matching database entries from step 620 depicted in FIG. 6. At 804, the control circuitry 304 may retrieve an indication of an sign language associated with the database entry. At 806, control circuitry 304 may receive metadata associated with a media asset including a plurality of closed captioning language tracks. In some embodiments, the media asset may be currently displayed on a display, such as display 312.

At 808, the control circuitry 304 may determine whether more than one matching database entry exists. If more than one database entry matches the user's gesture, then the gesture may be common to a plurality of sign languages. If there is only one matching database entry, then the sign language associated with the database entry may be identified as a preferred sign language, and the control circuitry 304 may continue to 816. At 816, the control circuitry 304 may select one of the closed captioning language tracks that corresponds to the matching sign language. For instance, each database entry, in addition to indicating the associated sign language, may also indicate one or more associated spoken and/or written languages. As an illustrative example, a database entry for a gesture in American Sign Language may indicate that spoken and written English are associated languages. The control circuitry 304 may retrieve the associated spoken/written languages and select the closed captioning language track that matches this spoken/written language. In some embodiments, the closed caption language tracks may include indicators that identify associated sign languages. In such embodiments, the control circuitry 304 may select the closed caption language track that matches the preferred sign language.

If there is more than one matching database entry at 808, then the control circuitry 304 may determine at 810 whether "manual mode" is activated. "Manual mode" may be a setting that the user sets in the media guidance application that indicates whether the user would like to manually identify a preferred sign language or closed caption track from a plurality of identified options. If manual mode is activated, then the control circuitry 304 may generate for display at 812 an alert with user-selectable options indicating sign languages associated with the database entries. In some embodiments, instead of displaying options for sign languages, the control circuitry 304 may identify one or more closed captioning language tracks that are suitable for the sign languages associated with the matching database entries. The control circuitry 304 may then receive a user selection of one of the options to indicate a preferred sign language or a preferred closed captioning track. If manual mode is not activated, then the control circuitry 304 may apply criteria at 814 to select one of the database entries that most closely matches the user's gesture. The criteria may include any suitable criteria for selecting one of the database entries over the others. For example, in some embodiments, the control circuitry 304 may rank the matching database entries to determine which database entry most closely matches the user's gesture. For example, the control circuitry 304 may rank the matching database entries based on the comparisons of the respective pixel maps with the pixel map associated with the user's gesture.

In some embodiments, the control circuitry 304 may also analyze other aspects of the sign languages of the matching database entries in order to select one database entry as corresponding to a preferred sign language. For example, the control circuitry 304 may analyze the cadence and/or grammar of the user's gestures. These embodiments may require the control circuitry 304 to capture additional images or videos of the user performing or communicating using additional gestures in the sign language. For instance, some sign languages may have characteristic cadences (such as timing or emphasis between two or more gestures) or grammar (such as a specific combination of a few words or sentence composition) that serve as further identifying features. In such embodiments, each of the database entries may have information on the specific cadence or grammar for the gesture in the associated sign language. In addition to comparing pixel maps, the control circuitry 304 may also compare the cadence and/or grammar information between the captured images or videos of the user and the database entries.

After the control circuitry 304 applies the criteria to the matching database entries, the control circuitry 304 may identify one of the database entries as corresponding to a preferred sign language and continue to 816 and select one of the closed captioning language tracks that corresponds to the preferred sign language.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for selecting a closed captioning language track, the method comprising:
   capturing an image or video of a user while the user is performing a first gesture of a sign language, the image or video of the user comprising a first pixel map;
   accessing a database comprising a plurality of entries, each entry comprising a pixel map that corresponds to a gesture in a respective sign language and an indication of the respective sign language;
   comparing the first pixel map to the pixel map of each of the plurality of entries, comprising, for each respective entry:
      extracting a second pixel map from the respective entry;
      calculating an average pixel value for the second pixel map;
      normalizing the first pixel map using the calculated average pixel value;
      comparing pixels of the first pixel map to pixels of the second pixel map;
      identifying a pattern of pixels from the first pixel map that is within a threshold value of corresponding pixels from the second pixel map;
   identifying, based on the comparison, an entry of the plurality of entries corresponding to a second gesture that matches the first gesture;

receiving metadata associated with a media asset, the metadata comprising a plurality of closed captioning language tracks, each closed captioning language track comprising closed captioning for the media asset in a different language; and selecting one of the closed captioning language tracks that corresponds to a sign language indicated in the identified entry.

2. The method of claim 1, further comprising generating for display the media asset with the selected closed captioning language track.

3. The method of claim 1, further comprising generating for display an alert which includes an indication of the selected closed captioning language track.

4. The method of claim 1, wherein capturing the image or video of the user occurs while the media asset is being generated for display.

5. The method of claim 1, further comprising:
identifying, based on the comparison, a second entry of the plurality of entries corresponding to a third gesture that matches the first gesture; and
generating for display an alert including user-selectable options indicating two of the closed captioning language tracks that correspond to sign languages indicated in the identified entries; and
wherein selecting one of the closed captioning language tracks comprises receiving a user selection of one of the options in the alert.

6. The method of claim 1, further comprising storing the selected closed captioning language track to a user profile.

7. The method of claim 1, wherein the gesture comprises one or a combination of the following: a hand shape, a hand orientation, a movement of the hand, arm, or body, a lip movement, or a facial expression.

8. The method of claim 1, wherein the plurality of different sign language libraries comprise libraries for one or more of the following: American sign language, Pidgin Signed English, Signing Exact English, Spanish sign language, Catalan sign language, French sign language, German sign language, British sign language, Chinese sign language, Japanese sign language, Irish sign language, Auslan, Swedish sign language, and finger spelling.

9. The method of claim 1, wherein comparing the identified pixels of the first pixel map with the second pixel map comprises scaling one of the first pixel map or the second pixel map.

10. The method of claim 1, wherein each of the plurality of entries comprises an indication of one or more associated spoken and/or written languages.

11. A system for selecting a closed captioning language track, the system comprising:
a storage device;
a database comprising a plurality of entries, each entry comprising a pixel map that corresponds to a gesture in a respective sign language and an indication of the respective sign language;
image detection circuitry configured to:
capture an image or video of a user while the user is performing a first gesture of a sign language, the image or video of the user comprising a first pixel map; and
store the first pixel map on the storage device;
control circuitry configured to:
access the database to retrieve the pixel map of each of the plurality of entries;
retrieve the first pixel map from the storage device;
compare the first pixel map to the pixel map of each of the plurality of entries, comprising, for each respective entry:
extracting a second pixel map from the respective entry;
calculating an average pixel value for the second pixel map;
normalizing the first pixel map using the calculated average pixel value;
comparing pixels of the first pixel map to pixels of the second pixel map;
identifying a pattern of pixels from the first pixel map that is within a threshold value of corresponding pixels from the second pixel map;
identify, based on the comparison, an entry of the plurality of entries corresponding to a second gesture that matches the first gesture;
receive metadata associated with a media asset, the metadata comprising a plurality of closed captioning language tracks, each closed captioning language track comprising closed captioning for the media asset in a different language; and
select one of the closed captioning language tracks that corresponds to a sign language indicated in the identified entry.

12. The system of claim 11, wherein the control circuitry is further configured to generate for display the media asset with the selected closed captioning language track.

13. The system of claim 11, wherein the control circuitry is further configured to generate for display an alert which includes an indication of the selected closed captioning language track.

14. The system of claim 11, wherein the control circuitry is further configured to capture the image or video of the user occurs while the media asset is being generated for display.

15. The system of claim 11, wherein the control circuitry is further configured to:
identify, based on the comparison, a second entry of the plurality of entries corresponding to a third gesture that matches the first gesture; and
generate for display an alert including user-selectable options indicating two of the closed captioning language tracks that correspond to sign languages indicated in the identified entries; and
wherein selecting one of the closed captioning language tracks comprises receiving a user selection of one of the options in the alert.

16. The system of claim 11, wherein the control circuitry is further configured to store the selected closed captioning language track to a user profile.

17. The system of claim 11, wherein the gesture comprises one or a combination of the following: a hand shape, a hand orientation, a movement of the hand, arm, or body, a lip movement, or a facial expression.

18. The system of claim 11, wherein the plurality of different sign language libraries comprise libraries for one or more of the following: American sign language, Pidgin Signed English, Signing Exact English, Spanish sign language, Catalan sign language, French sign language, German sign language, British sign language, Chinese sign language, Japanese sign language, Irish sign language, Auslan, Swedish sign language, and finger spelling.

19. The system of claim 11, wherein the control circuitry is configured to compare the identified pixels of the first pixel map with the second pixel map by scaling one of the first pixel map or the second pixel map.

20. The system of claim 11, wherein each of the plurality of entries comprises an indication of one or more associated spoken and/or written languages.

\* \* \* \* \*